Figure 1:
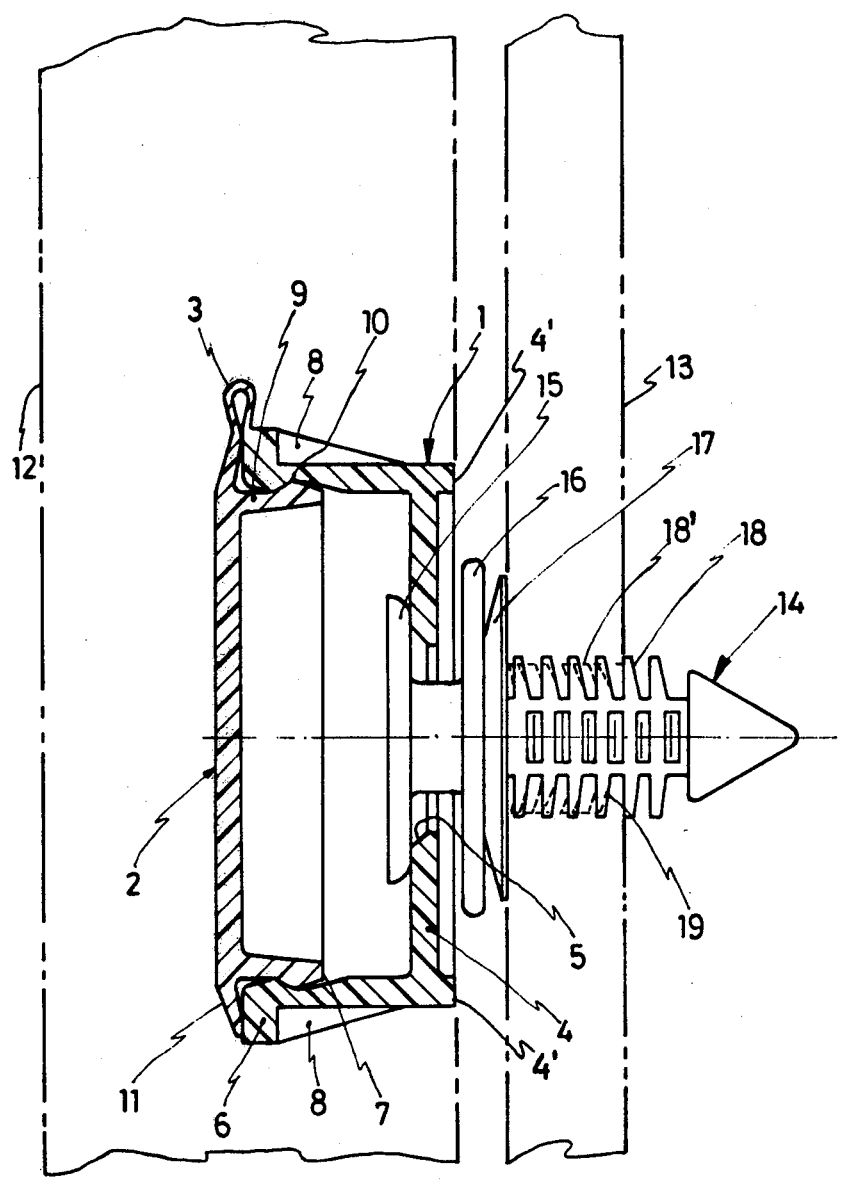

United States Patent [19]

Aimar

[11] 4,214,505
[45] Jul. 29, 1980

[54] BUSH FOR ANCHORING PANEL FASTENERS
[75] Inventor: Michele Aimar, Turin, Italy
[73] Assignee: ITW Fastex Italia S.p.A., Turin, Italy
[21] Appl. No.: 942,000
[22] Filed: Sep. 13, 1978
[30] Foreign Application Priority Data
  Sep. 26, 1977 [IT] Italy ............................... 22354/77[U]
[51] Int. Cl.² ........................ F16B 15/02; F16B 19/00
[52] U.S. Cl. .................................... 85/55; 24/73 PF; 85/5 R
[58] Field of Search ................... 85/9 R, 53, 55, 1 JP, 85/5 R; 151/41.7; 215/306; 24/107, 113 MP, 208 A, 213 R, 216, 73 PM, 73 P, 73 PF

[56] References Cited
U.S. PATENT DOCUMENTS
3,916,756  11/1975  Yoda .............................. 24/217 R X
4,136,598  1/1979  Hughes ................................. 85/55

FOREIGN PATENT DOCUMENTS
1085586  7/1960  Fed. Rep. of Germany ............. 85/55
 608864  9/1960  Italy ............................................. 85/53
 993021  5/1965  United Kingdom ..................... 85/1 JP Primary Examiner—Ramon S. Britts
Attorney, Agent, or Firm—J. R. Halvorsen; R. W. Beart

[57]  ABSTRACT

A bush of plastic material is provided which is intended to be embedded in the panel of semi-foamed or foamed synthetic resin and which comprises a cup-shaped portion having a bottom provided with a hole for anchoring the head of a panel fastener and a cover portion adapted to engage by snap action a mouth of said cup-shaped portion so as to provide a seal and integrally connected to the cup-shaped portion through a web acting as a hinge.

1 Claim, 2 Drawing Figures

BUSH FOR ANCHORING PANEL FASTENERS

This invention relates to panels designed to be used for lining metal parts such as for internally lining car doors.

It is known that such panels are secured to the metal structure generally by means of fasteners of plastic material having a head shaped as a circular sector which anchors to the panel and a shank provided with spring element by means of which it anchors by snap action to the metal part. Since such panels are made of rigid material, e.g. masonite, the anchoring of the fastener heads thereto does not present problems.

A problem arises when these panels are made of a material which is not sufficiently rigid to present a reliable undercut seat for the fastener head. In fact by the new techniques of manufacture these panels are made of a semi-foamed or foamed resin, particularly polyurethane, and since this material has a little stiffness, it is not possible to rely upon it to form the undercut seat of the fastener head.

The invention is directed to obviate this disadvantage.

More particularly this invention relates to a bush of plastic material intended to be embedded in the panel of semi-foamed or foamed synthetic resin and comprising a cup-shaped portion having a bottom provided with a hole for anchoring the head of a panel fastener and a cover portion adapted to engage by snap action a mouth of said cup-shaped portion so as to provide a seal and integrally connected to the cup-shaped portion through a web acting as a hinge.

A bush of this type solves the problem of providing in the panel of semi-foamed or foamed resin the rigid undercut seat for the fastener head and at the same time provides the sealing for this seat which prevents the entry therein of the semi-foamed or foamed resin during the foaming operation. Furthermore the bush acts as a stiffening means for the panel in the location wherein it is subjected to stresses during the assembly and disassembly operation by cooperating with other bushes to provide a support structure for the panel.

Figure 2:
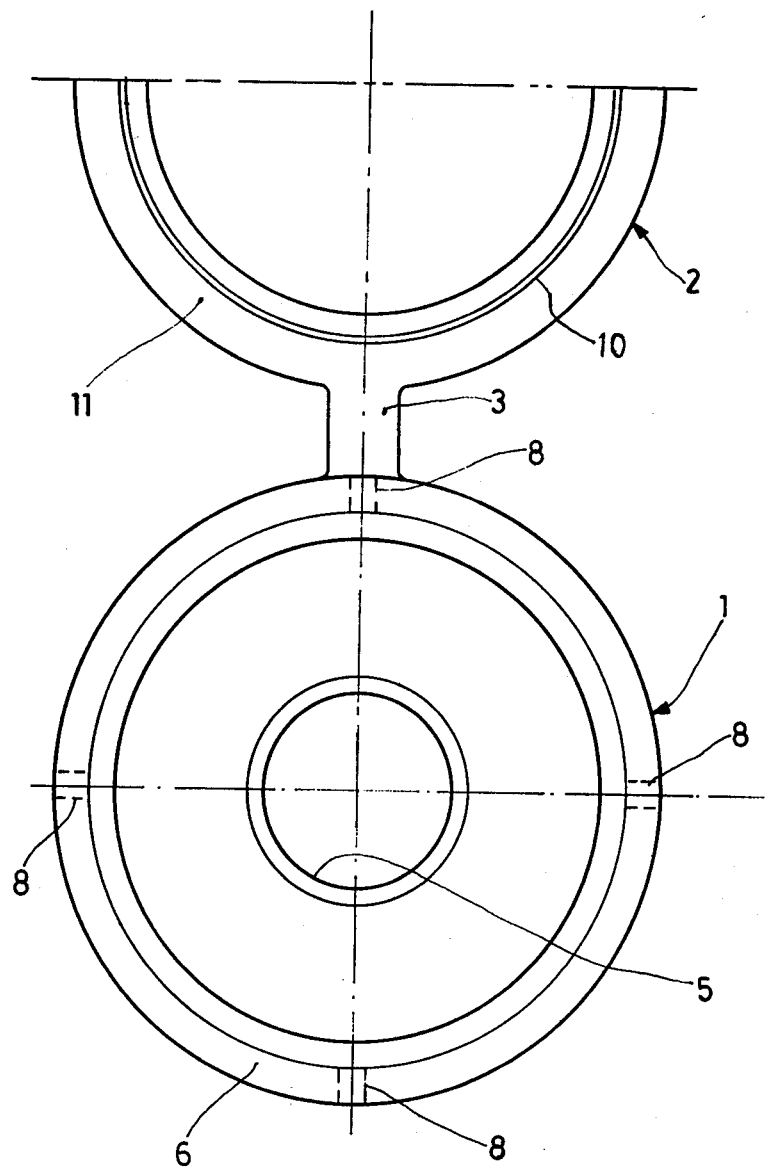

The invention will be better understood from the following detailed description taken in connection with the accompanying drawing, wherein FIG. 1 is a side elevation sectional view of a bush according to the invention with the cover closed; and FIG. 2 is a front elevation view of the bush of FIG. 1 with the cover opened, shown fragmentarily.

Referring to the FIGS. 1 and 2 a bush is shown comprising a cupshaped portion 1 and a cover 2 integrally connected to each other by a thin strip or web 3 acting as a hinge between the cover and the cupshaped portion. In the bottom 4 of the cup-shaped portion 1 a hole 5 is provided and a continuous axially projecting circumferentially disposed flange 4' extends beyond bottom 4. The upper or open end edge of the cup-shaped portion includes a lateral flange 6. Just below this upper edge the inner cylindrical wall of the cup-shaped portion has a circular groove 7. The outer cylindrical wall of the cup-shaped portion 1 carries four tapered ribs 8, arranged in spaced relation at 90° to each other and tapering inwardly from their supportive connection to the flange 6 to a line located a short distance from the bottom of the cylindrical wall.

Cover 2 has a frustoconical wall 9 forming on the outer side a cylindrically disposed rib 10 adapted to mate with and engage groove 7 on the inside wall of cup-shaped member 1. Cover 2 also includes at its closed end a resilient peripheral sealing flange 11 spaced a predetermined distance from rib 10.

One or more of the described bushes are placed in the mold used in forming a panel of semi-foamed or foamed resin before the foaming operation, with the cover 2 closed. When the cover 2 is closed on the cup-shaped portion 1 the wall 9 of cover 2 undergoes a deformation due to its flexibility until the rib 10 thereof engages by snap action into the groove 7 of the inner cylindrical wall of the cup-shaped portion 1. Thus, a seal is provided between the flange 6 of the cup-shaped portion 1 and the sealing flange 11 of cover 2 which prevents the resin from entering the bush during the foaming operation. The number of bushes arranged on the mold used to form panel 12 does correspond of course to the number of the panel fasteners used to secure the panel 12 to the metal structure 13. The axially extending flange 4' generally serves as a locating and sealing means to prevent access of foamed material into and adjacent the aperture 5 in bottom wall 4.

Once foaming has been accomplished the bush remains firmly anchored in the finished panel 12 designated by means of dotted lines in FIG. 1. The panel is now ready to be secured to the metal structure, e.g. a door 13 of a car, fragmentarily indicated by means of dotted lines in FIG. 1.

For fastening the panel, I resorted to the conventional panel fasteners of plastic material, which are of various kinds. Some of these have a head shaped as a circular sector and a shank provided with spring elements, as shown in U.S. Pat. No. 3,309,955. In FIG. 1 there is illustrated one of such panel fasteners chosen at random among those commercially available. Such panel fastener, generally indicated with 14, has a head 15, a flange 16, a further frustoconically shaped flange 17 and a shank comprising a set of spring lugs 18, as shown in U.S. Pat. No. 3,810,279. Head 15 of the panel fastener 14 is introduced in a usual manner, by taking advantage of its circular sector shape, into the hole 5. Then, the shank 18 of the panel fastener is inserted in the proper hole provided in the metal piece 13. This hole has such a diameter that the spring lugs 18 must bend as indicated at 18', in order to pass through the hole. As the metal piece 13 contacts the flange 17, the latter, acting as a resilient seal, compresses until one of the bent lugs 18 emerges from the opposite side of hole 19, resuming its original configuration and acting as a shoulder against the piece 13. Panel 12 is thus fastened to the piece 13 by means of the panel fastener 14. As already mentioned, the panel fastener could be of a kind other than that described, but which has been described by way of example only. Therefore, the specific panel fastener does not form a part of the present invention.

The bush 1 according to this invention is firmly anchored into the semi-foamed or foamed resin of the panel and cannot be moved by outer stresses neither in axial direction nor about its axis. The movement in axial direction is prevented by the engagement of flange 6 with the undercut formed in correspondence thereof in the panel during the foaming operation. The rotation of bush is prevented by ribs 8 embedded within the panel.

What I claim is:

1. A bush adapted for anchoring panel fasteners in foamed or semi-foamed plastic panels, characterized in that the bush comprises a cup-shaped portion with a flange at one end of said portion and having a bottom provided with a hole adapted for anchoring the head of a panel fastener and a cover portion adapted to engage by snap action the open mouth of said cup-shaped portion so as to provide a seal, said cup-shaped portion being provided with a plurality of axially extending peripherally spaced ribs on its side wall which taper inwardly from their juncture with said flange to a line spaced from but adjacent the bottom end of said cup-shaped portion whereby said flange and ribs interlock with said foam material to prevent axial and rotational movement of said bush.

* * * * *